(12) United States Patent
Groom et al.

(10) Patent No.: US 7,796,118 B2
(45) Date of Patent: Sep. 14, 2010

(54) INTEGRATION OF NAVIGATION DEVICE FUNCTIONALITY INTO HANDHELD DEVICES

(75) Inventors: David J. Groom, Seattle, WA (US); Kabir Siddiqui, Sammamish, WA (US); Shawn M. Brown, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1409 days.

(21) Appl. No.: 11/135,716

(22) Filed: May 24, 2005

(65) Prior Publication Data

US 2006/0267940 A1 Nov. 30, 2006

(51) Int. Cl.
*G09G 5/08* (2006.01)
(52) U.S. Cl. ........................... 345/163; 345/173
(58) Field of Classification Search ........ 345/156–173
See application file for complete search history.

(56) References Cited

U.S. PATENT DOCUMENTS 7,366,540 B2 * 4/2008 Ansari et al. ............ 455/556.1
2002/0118167 A1 * 8/2002 Mei et al. .................... 345/163
2004/0012568 A1 * 1/2004 Velikov et al. ............... 345/163
2004/0263493 A1 * 12/2004 Yueh .......................... 345/179
2005/0219209 A1 * 10/2005 Fleck et al. .................. 345/157
2007/0188472 A1 * 8/2007 Ghassabian ................. 345/169

* cited by examiner

*Primary Examiner*—Nitin Patel
(74) *Attorney, Agent, or Firm*—Woodcock Washburn LLP

(57) ABSTRACT

A system that integrates navigational device (e.g., mouse) functionality into a cellular telephone or other handheld device (e.g., personal organizer, personal media player). A device can employ existing optics from an image capture device (e.g., camera) as the optics for the mouse. A mouse engine can receive an input from the optics and route the input via a Bluetooth™, or other existing connection (e.g., wired or wireless) to transfer the mouse coordinates to a desktop. In another example, a device can employ a touch sensitive pad to supply motion input to a mouse engine. Further, a device (e.g., personal organizer, pocket personal computer) can utilize an existing touch screen as a touch sensitive input to a mouse engine. A laser pointer can be integrated into a device thereby enabling presenters to use the device to point to slides and other target visuals.

16 Claims, 14 Drawing Sheets

INTEGRATION OF NAVIGATION DEVICE FUNCTIONALITY INTO HANDHELD DEVICES

TECHNICAL FIELD

Aspects of this invention are related to controlling a graphical user interface (GUI) and more particularly to enabling control of a GUI by integrating pointing device functionality into a handheld communication or data organization device.

BACKGROUND OF THE INVENTION

A navigational device (e.g., mouse or pointing device) is universally used in computing to navigate and effect selection of graphical representations on a computer display. Early navigation devices used two external perpendicular gear wheels to effect navigation. Later versions replaced the external gear wheels with a single ball capable of rotating in any direction. In this ball design, motion could be detected via internally mounted wheels within the device body and translated into a movement of a cursor on a computer display.

Another common type of navigation device is the track ball. Effectively, a track ball can be described as an inverted mouse. A trackball is a special type of pointing device having a ball housed in a socket and containing sensors that detect rotation of the ball about two axes. In operation, a user can roll the ball with a thumb, finger, or the palm of their hand to move a cursor relative to a display. Track balls are common where there is limited desk space on which to use a mouse. For example, computer-aided design (CAD) workspaces are frequently equipped with track ball navigation devices.

More recently, navigation devices that employ optical sensing technologies have emerged. These navigation devices employ optical sensors on the underside of the device together with LEDs (light emitting diodes) to illuminate a surface. Other technological developments employ laser diodes in the place of an LED source. Although earlier optical navigation devices could only be used on a metallic surface, usually imprinted with a grid pattern, enhancements in circuit design made it possible to employ more powerful image processing chips in connection with the devices. These more powerful chips enable the optical navigation devices to be used on any device material and to translate the movement of the navigation device into a movement of a cursor or pointer on a computer display.

Modern optical navigation devices can snap images of a surface on which the device is employed. These images can then be processed and translated into a relative spatial movement of a cursor or pointer on a computer display.

Today, cellular telephones running on state-of-the-art operating systems have increased computing power in hardware and increased features in software in relation to earlier technologies. For instance, cellular telephones are often equipped with built-in digital image capture devices (e.g., cameras) and microphones together with computing functionalities of personal digital assistants (PDAs). Since these devices combine the functionality of cellular phones with the functionality of PDAs, they are commonly referred to as "smartphones." The hardware and software features available in these smartphones and similar technologically capable devices provide developers the capability and flexibility to build applications through a versatile platform. The increasing market penetration of these portable devices (e.g., PDAs) inspires programmers to build applications, games, ring-tones, etc. for these smart-phones.

As described above, many smartphones have built-in digital still cameras capable of generating video graphics array (VGA) quality pictures having 640×480 pixel resolution. Several higher-end smart-phones, especially those developed in the European and Asian markets, are capable of taking pictures of 1 Mega-pixel resolution and higher. With the technological advances in handheld and portable devices, there is an ongoing and increasing need to maximize the benefit of these continually emerging technologies.

The number of peripherals that mobile workers carry in order to perform their job at maximum efficiency is not optimal. For example, a device inventory that a business professional carries today often includes a cellular telephone or smartphone, a PDA, a laptop and an external computer mouse. Eliminating a commonly used item such as an external computer mouse from a mobile workers bag would potentially alleviate some level of stress in completing computer related tasks outside of the workplace.

To this end, there is a substantial unmet need to reduce the number of devices and to combine and/or integrate functionality of the numerous devices carried by the business professional.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention disclosed and claimed herein, in one aspect thereof, comprises a system that integrates navigational device (e.g., mouse) functionality into a cellular telephone or other handheld device (e.g., personal organizer, personal music player). In one aspect, a device can employ existing optics from an integrated image capture device (e.g., camera) as the optics for the mouse. In other aspects, an LED or laser diode can be added as a light source to enable the device. A mouse engine can receive an input from the optics and route it over a human interface device (HID) Bluetooth™, or other suitable, connection protocol (e.g., wired or wireless) to transfer the mouse coordinates to a desktop.

In yet another aspect, a device can employ a touch sensitive pad to gather spatial information. For example, a touch sensitive pad can be arranged on the back of the phone and can be used in order to supply input to a mouse engine. The mouse engine can facilitate routing the data through a connection to the desktop.

Still another aspect of invention describes a device (e.g., personal organizer, pocket personal computer, personal music player) that can utilize an existing touch screen as a touch sensitive input to a mouse engine. The motions on the touch screen and the acceleration associated therewith can be routed through a mouse engine to be converted to data that effects navigation of a cursor on a computer desktop.

Other aspects can integrate a laser pointer into the device thereby enabling presenters to use the device to point to slides and other target visuals. Each of the aspects described above can employ existing keys on the device to launch applications on the desktop while navigating or engaging in a conversation using the device. For example, the device can be employed as a remote control to media computers or to control presentations.

In yet another aspect thereof, an artificial intelligence component is provided that employs a probabilistic and/or statistical-based analysis to prognose or infer an action that a user desires to be automatically performed.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
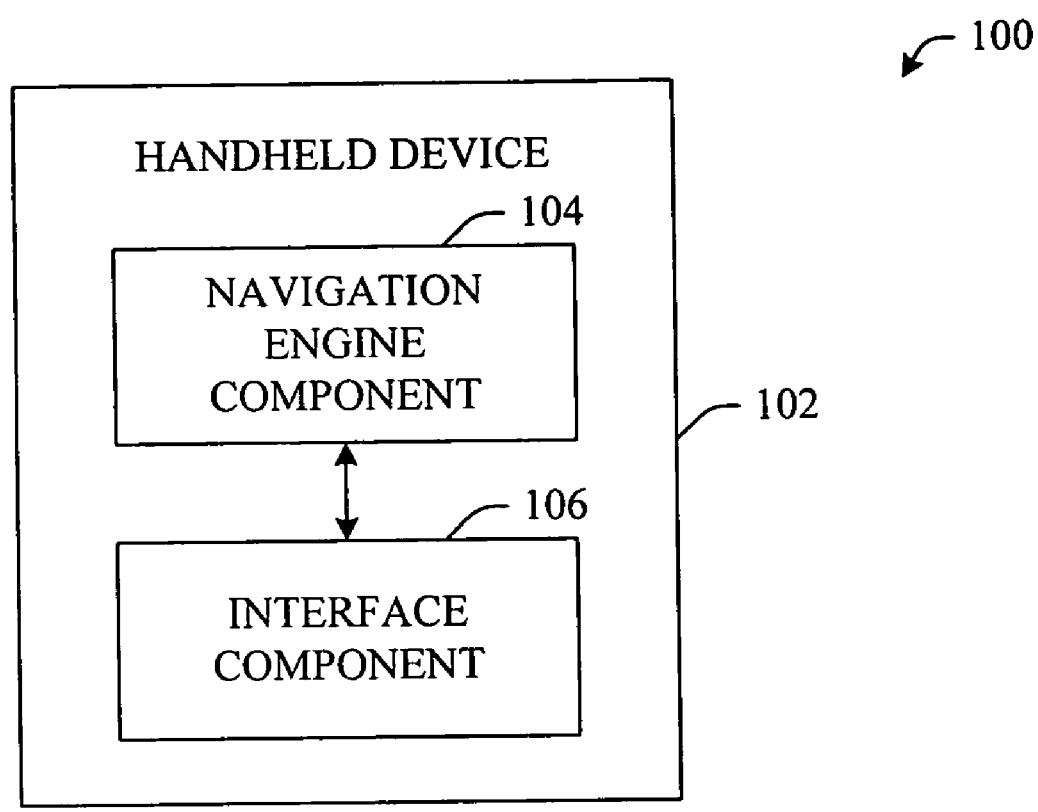
FIG. 1 illustrates a general component block diagram of a system that integrates a navigation engine into a handheld device in accordance with an aspect of the subject invention.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

With the increase in use of mobile phones in conjunction with laptops via "modem link" (e.g., tethering) or with the basic increase in the mobile worker, integrating a pointing device (e.g., mouse) into a cellular telephone can minimize the number of items a mobile professional would have to carry. In three disparate examples, three types of mice could be developed, the wireless (or wired) optical mouse, the wireless (or wired) touch pad mouse and the wireless (or wired) touch screen mouse. Upon a review of the figures that follow, it will be appreciated that aspects of integrated mice can allow a user to navigate within a graphical desktop while, at the same time, engaging in a conversation on the telephone.

The subject invention, in one aspect thereof, provides for incorporating pointing device functionality into a handheld device. More particularly, in one aspect, the invention integrates pointing device functionality into a cellular telephone. A pointing device can refer to any hardware component that allows a user to input spatial data to a computer. Computer-aided design (CAD) systems and graphical user interfaces (GUIs) can accept control commands and data via a pointing device. For example, a user can "click-and-drag" by moving a mouse across a surface and activating buttons on the mouse. These spatial movements can be translated and mimicked on the screen.

Referring initially to FIG. 1, a system 100 generally can include a handheld device 102 having a navigation engine component 104 and an interface component 106. Although the handheld devices described herein are primarily cellular telephones, it is to be appreciated that the invention can be employed in connection with any portable device including, but not limited to, cellular telephones, smartphones, personal data assistants (PDAs), personal pocket computers (PPCs), personal music players (e.g., MP3-file format players) or the like.

Interface component 106 can integrate navigation engine component 104 into the handheld device 102. Accordingly, the handheld device 102 can communicate with a host device (e.g., personal computer, laptop) to effect navigation within a graphical representation. In other words, this invention facilitates the use of a handheld device (e.g., cellular telephone) as a navigation device (e.g., mouse, pointing device, trackball).

In one aspect, the invention can employ OEM (original equipment manufacturer) integrated image capture device (e.g., camera) as an optics component to detect motion relative to a flat surface on which the device (e.g., handheld device 102) is placed. This motion can be converted into motion of a cursor or pointer on a computer display. This, and other aspects, will be better understood upon a reading of the description of the figures that follow. It is to be appreciated that utilization of existing OEM optics presumes that the optics are capable of the close focal point and/or capture rates necessary for use in the functionality of an optical mouse. Accordingly, aspects of the invention can employ optics whereby the capture rate and focal point can be adjustable in a fashion to allow a detailed image to be captured for mouse functionality. Alternatively, optics separate from the image capture optics can be employed to effect pointing device functionality.

Figure 2:
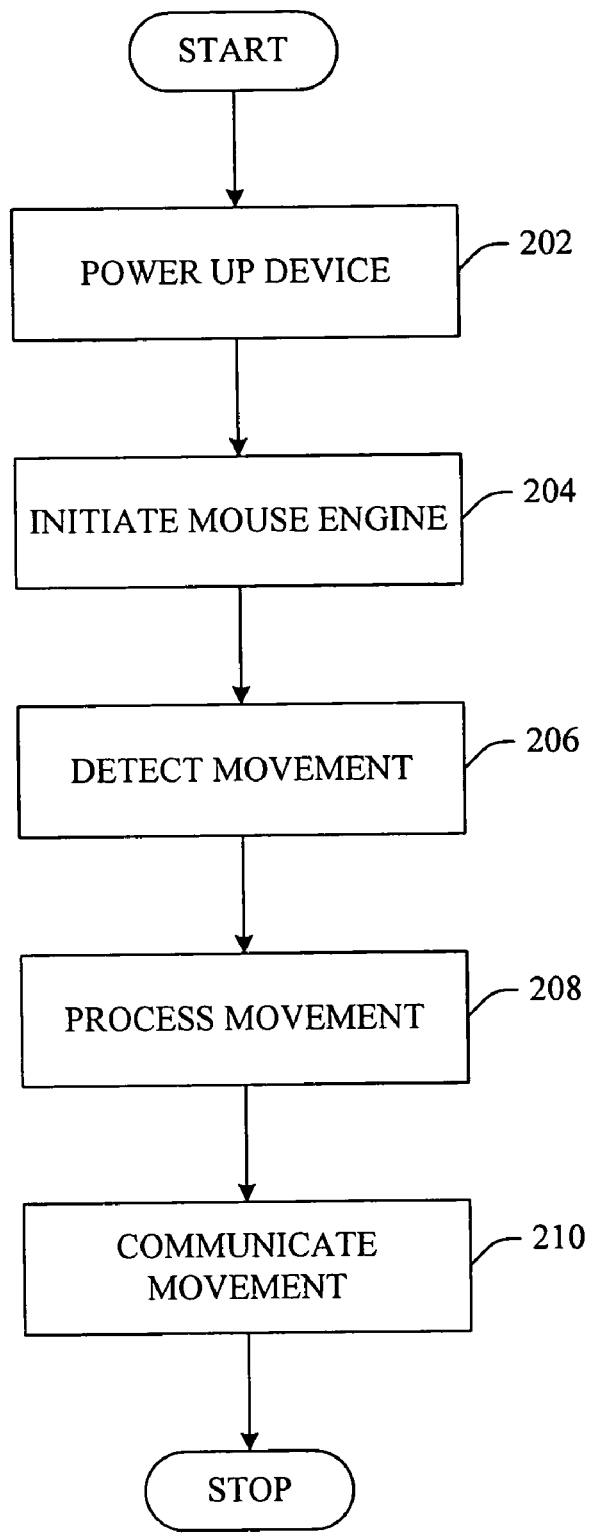
FIG. 2 illustrates an exemplary flow chart of procedures to detect motion via a handheld device in accordance with a disclosed aspect.

FIG. 2 illustrates a methodology of interfacing mouse functionality in accordance with an aspect of the invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

At 202, the device can be powered up. It will be appreciated that this act can include powering up the handheld device (e.g., cellular telephone) as well as simply powering up the navigation device functionality incorporated within the handheld device. Accordingly, the handheld device can employ a separate power source relative to the communication/organization functionality from the power source employed in connection with the navigation device.

The mouse (e.g., navigation device) engine can be initiated at 204. For example, in an optical aspect, it is to be appreciated that initiating the engine can include capturing a reference image frame and a sample frame. Additionally, initiating can include processing the frames relative to each other in order to determine motion parameters. Relative movement can be detected at 206. As will be understood, movement can be detected by sliding the device parallel to a surface on which it is placed. This detection can be captured using optics, a roller ball or the like.

Other methods of inputting and detecting movement can be employed in alternative aspects. For example, a touch pad or touch screen can be employed to detect movement of a stylus, a user's finger or other pointing device used in connection with these devices. Additionally, a track ball device can be incorporated into a handheld device and employed to detect relative spatial movement.

It will be appreciated that a touch pad can refer to an input device commonly used in connection with laptop computers. Similar to a mouse or other navigational device, a touch pad can be used to move a cursor on a graphical display. Movement can be effected by converting motions of a user's finger upon the surface of the touch pad. Touch pads commonly operate by sensing the capacitance of a finger, or the capacitance between sensors. Capacitive sensors can be placed along the horizontal and vertical axes of the touchpad. The location of the finger can be determined from the pattern of capacitance from these sensors.

In addition to control buttons associated with a touch pad, a user can also "click" by tapping a finger on the touchpad. A "click-and-drag" can be accomplished by a tap followed by a continuous dragging motion. As well, in accordance with the invention, "hotspots" can be provided to effect personalized and/or preprogrammed functionality.

It will be appreciated that a touch screen can refer to an input device that allows the user to interact with a computer by touching the display screen. A spatial location of a touch onto the screen of the handheld device can be calculated from a capacitance for the X and Y axes, which varies based upon where the screen is touched.

At 208, the movement can be processed and/or converted to movement relative to a computer display. These converted movement instructions can be communicated to a computer and rendered accordingly. It will be appreciated that any method of communication can be employed in accordance with the invention. For example, any wired and/or wireless communication protocol can be employed in accordance with alternate aspects.

Figure 3:
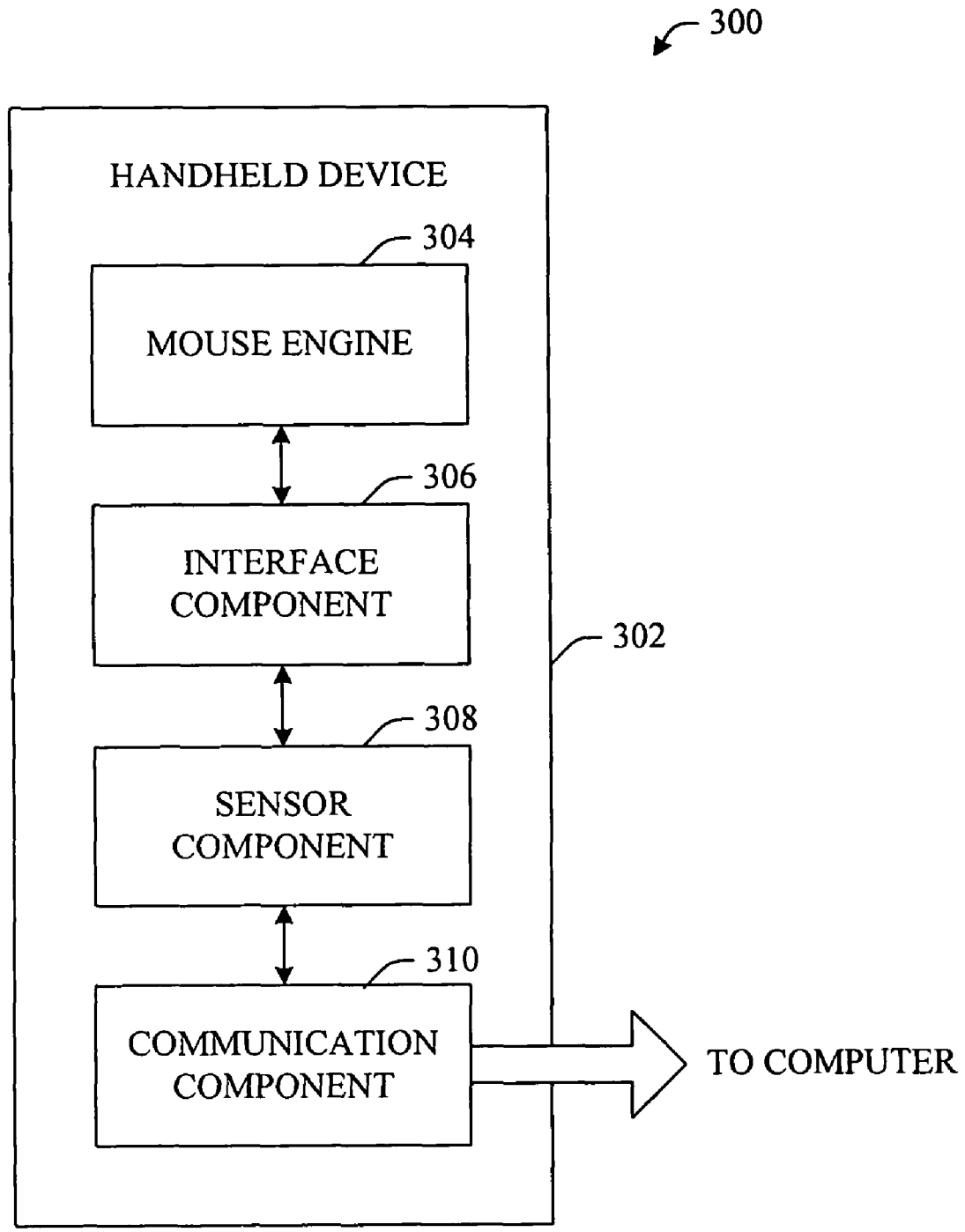
FIG. 3 illustrates a general component block diagram of a system having a sensor component and a communication component in accordance with an aspect of the subject invention.

FIG. 3 illustrates an alternate system 300 that facilitates employing a handheld device 302 as a navigational device. System 300 can include a mouse engine component 304, an interface component 306, a sensor component 308 and a communication component 310. As illustrated, mouse functionality and corresponding components (304, 306, 308) can be incorporated into the handheld device 302 whereby spatial movement information can be transferred to a computer via communication component 310.

In operation, a user can place the handheld device 302 on a horizontal surface. Accordingly the handheld device can be moved (e.g., pushed or pulled) in any direction. Mouse engine component 304 can include a roller ball (not shown). Moving the handheld device 302 on the surface can turn the ball. Accordingly, a set of X and Y rollers can grip the ball thereby transferring (via sensor component 308) movement information to the mouse engine component 304. In a mechanical mouse aspect, optical encoding disks having light holes can be provided. Accordingly, infrared LEDs (light emitting diodes) can shine through the disks. Sensor component 308 can gather light pulses to convert to X and Y velocities. Communication component 310 can transmit the converted velocities to a computer as illustrated.

Figure 4:
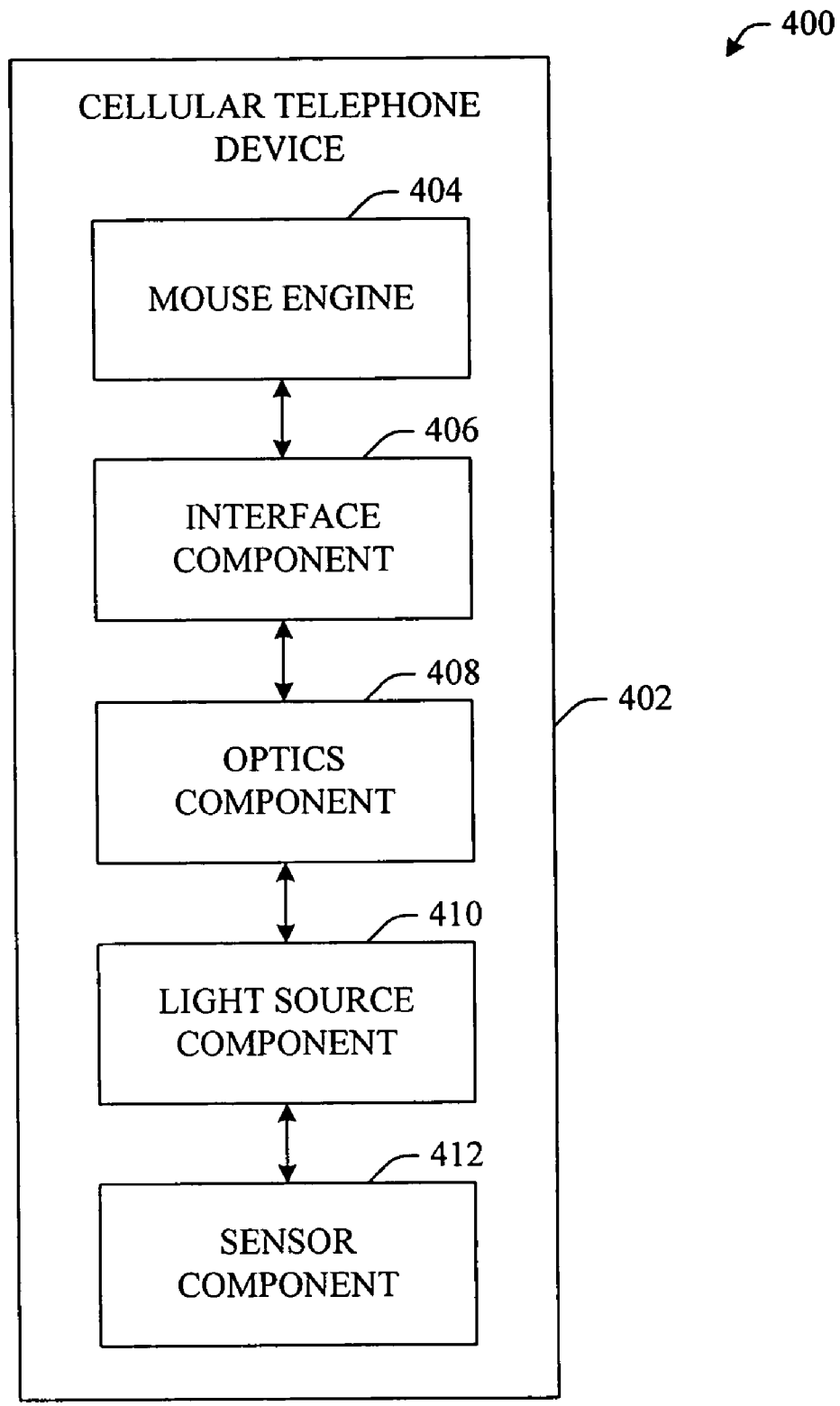
FIG. 4 illustrates a general component block diagram of a system that can use an existing dual-purpose optics component to facilitate navigation in accordance with an aspect of the subject invention.

Turning now to an alternate aspect of the invention, FIG. 4 illustrates system 400 that can utilize image capture optics to facilitate capturing and communicating movement to a computer. More particularly, FIG. 4 illustrates a cellular telephone 402 having a mouse engine 404 incorporated via interface component 406. Optics component 408 can be dual-purpose with an image capture system of the cellular telephone 402. In other words, cellular telephone 402 equipped with a camera can also utilize the camera optics to effect the optics component 408 used in connection with mouse functionality. A light source component 410 can be provided along with a sensor component 412 to effect acquiring spatial movement information. Communication component (not shown) can be provided to transfer movement information to a computer or other host device whereas a cursor or other graphical representation can be displayed.

Upon establishing a connection between cellular telephone 402 and the computer (e.g., laptop/desktop), either by Bluetooth™ connectivity or another wireless or wired protocol, the user can then use a desktop Bluetooth™ wizard to configure the cellular telephone 402 and/or mouse engine 404 as a human interface device (HID). Accordingly, the handheld device (e.g., cellular telephone 402) will be able to be used as a mouse (e.g., pointing device) as well as retaining its default or core functionality as a cellular telephone phone. While connected to the host (e.g., computer), the telephone 402 has the ability to use the connection to not only navigate around a user interface or to control a media center (e.g., television) but to also launch applications using key presses on the telephone.

It will be appreciated that surface-independent optical mice can be included and can employ the sensor component 412 in conjunction with the optics component 408 to take successive images of a surface beneath the mouse. Progressions between one frame and the next can be processed by a chip in the mouse engine 404 and translated into movement on two axes. For example, an optical mouse can frequently process in excess of 1500 frames per second. Each frame can be a rectangular array of 18×18 pixels. As well, it will be appreciated that each pixel can sense 64 different levels of gray.

Figure 5:
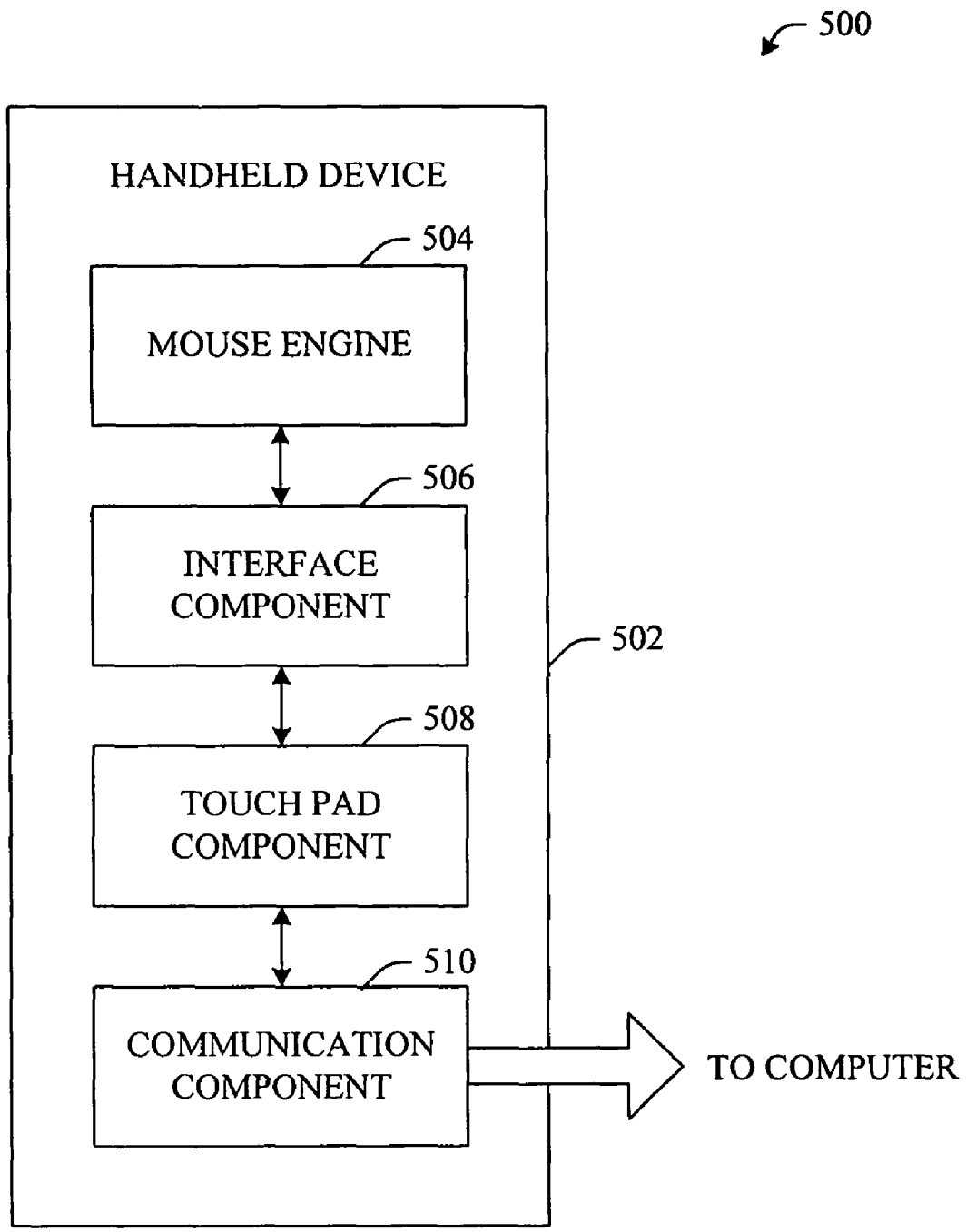
FIG. 5 illustrates a general component block diagram of a system having a touch pad component in accordance with an aspect of the subject invention.

FIG. 5 illustrates an alternate aspect of the invention. More particularly, FIG. 5 illustrates system 500 that includes a handheld device 502, a mouse engine 504, an interface component 506, a touch pad component 508 and a communication component 510. In accordance with the aspect of FIG. 5, the touch pad component 508 can be employed to accept movement input that can be transferred to a computer via communication component 510 as shown.

It will be appreciated that the touch pad component 508 can be arranged in any location on the handheld device 502. In one aspect, the touch pad component 508 can be deployed on the rear portion of the handheld device 502. Accordingly, in the case of a cellular telephone, a user can easily engage in a conversation using the cellular telephone while operating touch pad component 508, which is rear mounted, with an index finger to control spatial movement of a pointer on a computer display. This aspect will become clearer upon a discussion of the figures that follow.

Figure 6:
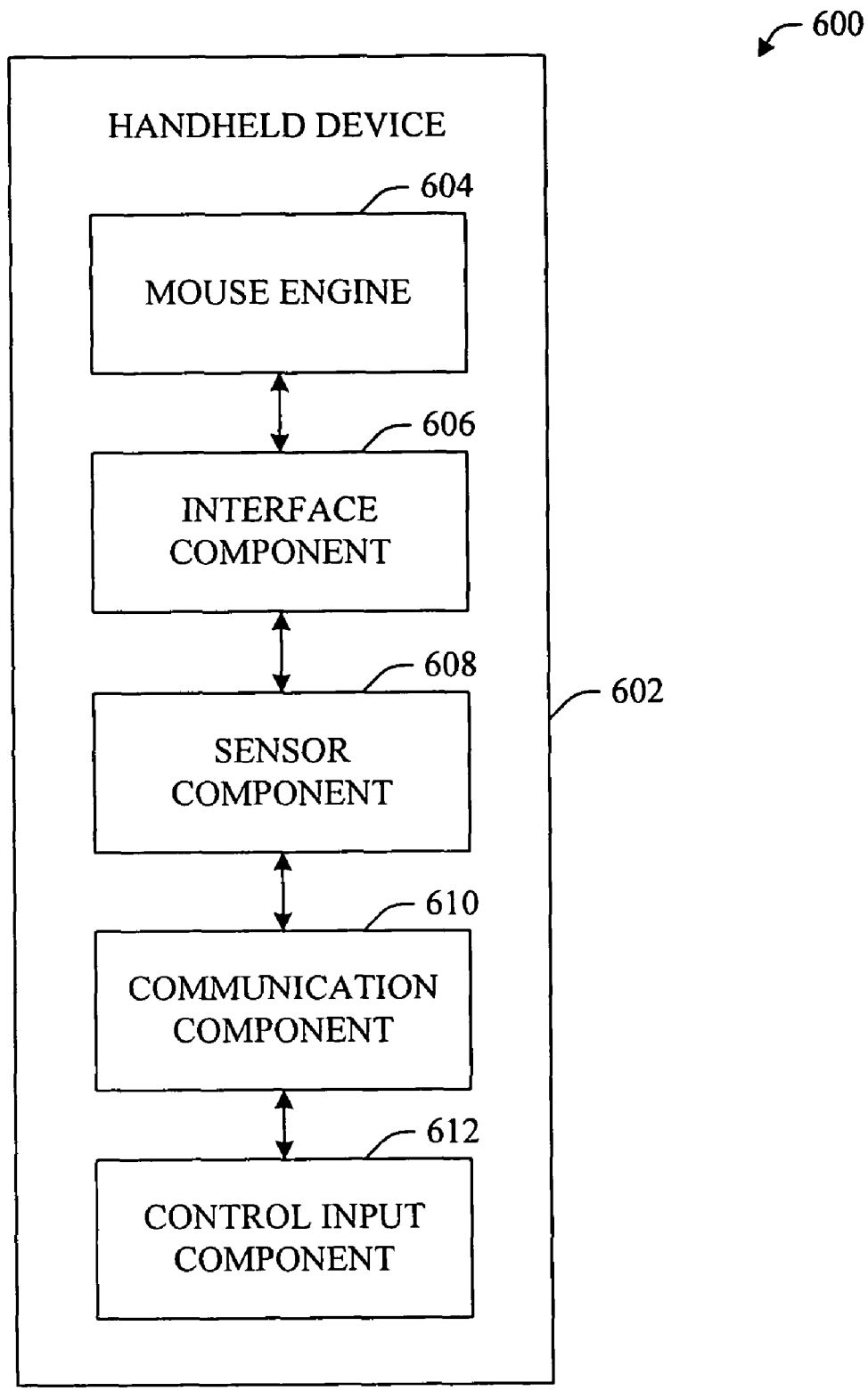
FIG. 6 is a handheld device that can employ a control input component in accordance with an aspect of the invention.

Illustrated in FIG. 6 is still another aspect of the invention. System 600 illustrated in FIG. 6 can include a handheld device 602 that includes a mouse engine 604, an interface component 606, a sensor component 608, a communication component 610 and a control input component 612. Components with like names can have the same or similar functionality as counterparts described in the figures set forth supra.

This control input component 612 can effect user inputs including, but not limited to, "right click", "left click", "single click", "double click", "triple click" or the like. In other words, in one example, keys on a key pad of the handheld device 602 can be employed as a control input component 612. As well, tapping a touch pad can be part of control input component 612. In still another example, speech recognition can be employed to effect control input component 612.

Figure 7:
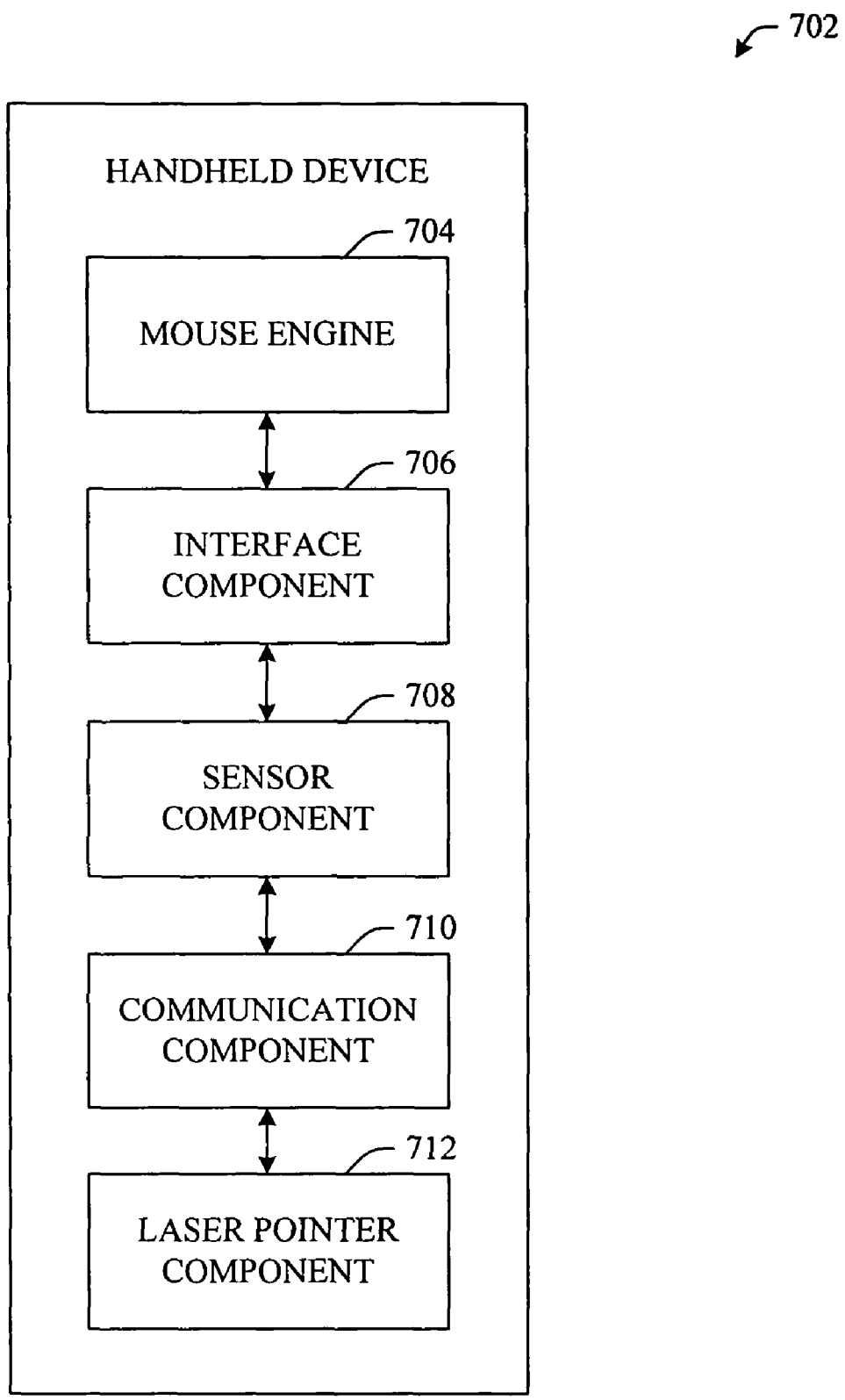
FIG. 7 illustrates a handheld device having a laser pointer component in accordance with an aspect of the invention.

Referring now to FIG. 7, a handheld device (e.g., cellular telephone) 702 is shown. As described with reference to the handheld devices above, handheld device 702 can include a mouse engine 704, an interface component 706 a sensor component 708 and a communication component 710. Additionally, handheld device 702 can be equipped with a laser pointer component 712. Effectively, laser pointer component 712 can enable a user to employ the handheld device 702 to identify a target by illuminating the target item with a beam emitted via laser pointer component 712.

FIGS. 8A to 8C, 9A to 9C and 10A to 10C illustrate exemplary designs of a handheld device that can be employed as a navigation device and/or laser pointing device. It is to be appreciated that the exemplary designs illustrated and described herein are included merely to provide context to the invention. These exemplary aspects are not intended to limit the invention in any way.

Figures 8A, 8B, 8C:
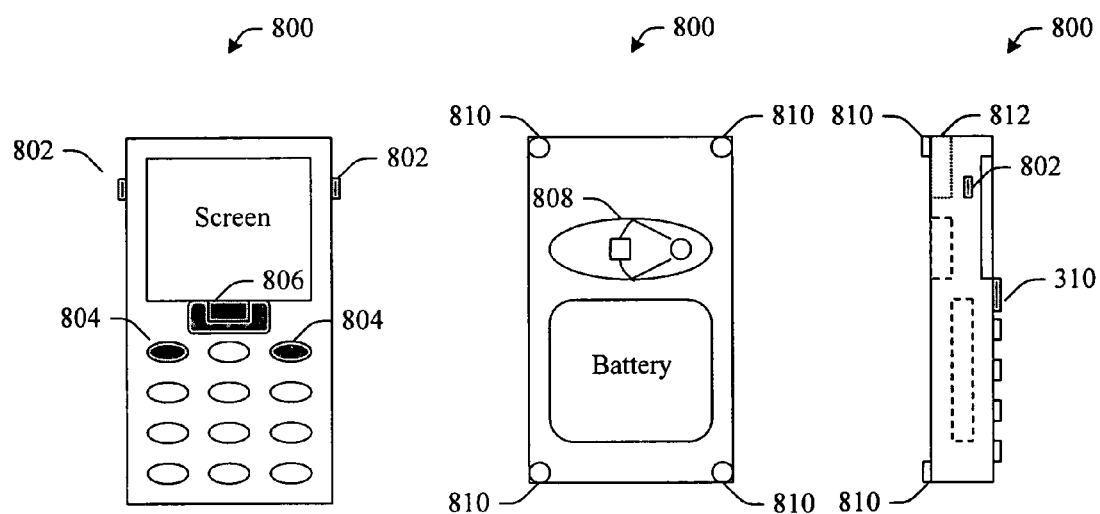
FIGS. 8A to 8C illustrate a handheld device having an image capture system (e.g., camera) in accordance with an aspect.

FIGS. 8A to 8C illustrate a handheld device 800 having an image capture system (e.g., camera) that can perform navigation functionality. Accordingly, handheld device 800 can be employed as an optical navigation device. Referring first to the front view of handheld device 800 shown in FIG. 8A, optional control buttons 802 can be placed on the right and left sides of the device housing. Additional control buttons 804 can be programmed to utilize the handheld device 800 keypad. It is to be appreciated that any key or combination of keys can be programmed to assist in the functionality of the navigation device of the invention. It will be understood that the keys (802, 804) illustrated as well as other programmable keys can perform the "clicking" functionality (e.g., selection) of a navigation device.

Although, variations in shape, number, and placement often exist, functionality of navigation device buttons (e.g., keys 802, 804) is generally consistent across devices. Early mice had a single button however, today, navigation devices (including the subject invention) exist with any number of control keys. As well, in accordance with the invention, each of the applicable control buttons can be programmed as desired.

It will be appreciated that popular mice devices can utilize two or more control buttons (e.g., 3, 4, 5 buttons). For example, while the first button is primarily used for selection, the second button can often invoke a contextual menu in an interface. This menu can contain options specifically tailored to the interface element over which the mouse was positioned. This is often referred to as a "right click."

In accordance with a three button mouse, pressing the center button (e.g., a "middle click") is often used as a convenience to map the action to a commonly used action (e.g., macro). User preferences can be programmed into additional buttons in accordance with the invention. It will be appreciated that the existing buttons of the device key pad can be employed to effect personalized and/or programmable functionality. By way of example, the extra buttons can allow forward and backward web navigation. As well, computer-implemented games can often utilize these programmable function buttons.

A navigation wheel 806 can be included to effect the functionality of scrolling/scanning on a graphical representation. The navigation wheel 806 can include a 360-degree rotatable disk, a slide-type switch as well as a toggle switch-like mechanism. The navigation wheel 806 (or scroll wheel) can be a small wheel, with its axis oriented parallel to the navigation surface. The wheel 806 can be rotated up or down to provide one-dimensional input. It will be understood that this input is often translated into scrolling up or down within a currently selected window.

Other aspects of the invention can incorporate a rocker-type button rather than a wheel. The rocker-type button is a pivotable button that can be pressed on one side or the other thereby simulating up and down (or right and left) motion respectively. Another use of the wheel or rocker-type button can be to zoom in and/or out of an application window.

FIG. 8B illustrates a rear view of handheld device 800. As shown, handheld device 808 can include an optics component 808. As described earlier, so long as the focal point and capture rate are sufficient for mouse functionality, optics component 808 can be the same optics utilized by the handheld device 800 image capture mechanism (e.g., camera). In this scenario, it will be appreciated that this dual purpose can reduce manufacturing cost of device 800. Although FIG. 8B illustrates optics component 808 deployed on the rear of device 800, it is to be appreciated that optics component 808 can be deployed in any position on the handheld device without departing from the spirit and/or scope of the invention. As described supra, in the event that the existing optics do not have the sufficient focal qualities and/or capture rate, additional optics can be employed to effect optical mouse functionality.

Optional pads 810 can be employed to reduce friction of the device when placed and moved on a parallel surface. For example, when the device 800 is placed on a horizontal surface, pads 810 can both reduce friction of sliding the device in any direction as well as can protect the device 800 and surface from damage. It will be appreciated that pads 810 can be made of any material suitable to reduce friction while protecting the device 800 and surface. By way of example, pads 810 can be constructed of plastic, felt-like materials, etc.

An internal (or external) antenna 812 can be used to communicate motion information to a computer. It will be appreciated that any suitable wireless (or wired) protocol can be employed to transmit to the computer. In one example, Bluetooth™ wireless protocol can be used. In other aspects, infrared or wired (e.g., USB protocol) can be used to communicate with the computer.

Figure 9A:
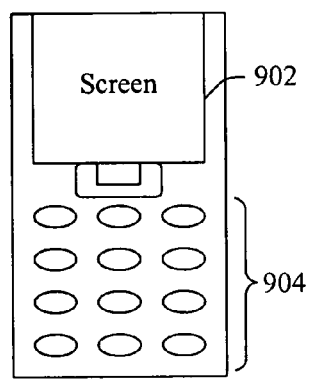
FIGS. 9A to 9C illustrate an aspect of the invention that employs a touch pad mechanism in lieu of the optics described in FIGS. 8A to 8C.
Figure 9B:
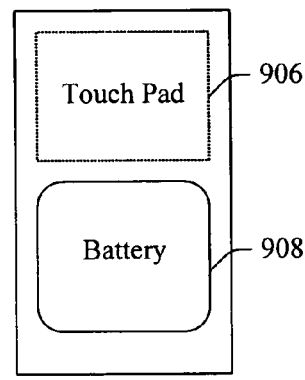
Figure 9C:
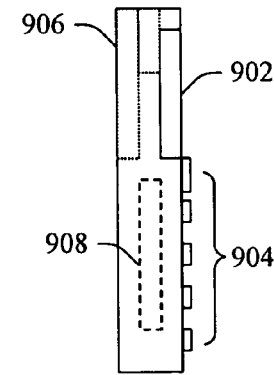

FIGS. 9A to 9C illustrate an aspect of the invention that employs a touch pad mechanism in lieu of the optics described in FIGS. 8A to 8C. A front view of device 900 is shown if FIG. 9A. A screen 902 and key pad 904 can be deployed on the front portion of the device. It will be appreciated that in this example, the screen 902 and key pad 904 can be employed to effect core functionality of the device 900. For example, suppose the device 900 is a cellular telephone, the screen 902 and the key pad 904 can assist a user to initiate and receive telephonic communication.

A touch pad 906 can be arranged on the rear portion of the device as illustrated in FIG. 9B. Increased ergonomic use can be experienced by arranging touch pad 906 on the rear portion of the device 900. By way of example, suppose a user is holding the device 900 to an ear while engaging in a telephone conversation. The index finger of the same hand that supports the device 900 can be used to navigate a cursor via touch pad 906.

Although the examples illustrated in the figures employ substantially rectangular housed devices, it will be appreciated that other aspects can exist that further enhance ergonomic features of the invention. For example, the housing can be contoured to a user hand whereas the device 900 can better fit into the palm of the hand. As well, in the touch pad 906 aspect illustrated in FIGS. 9A to 9C, the touch pad 906 can be arranged such that a user can more easily access the touch pad 906 and corresponding selection buttons 904.

A battery 908 is illustrated in FIG. 9B. The battery 908 can be utilized as a power source for both the device 900 core functionality as well as the navigation device functionality of the invention. It is to be understood that an additional battery (not shown) can be employed to separately supply power to the navigation device 900. As well, the core functionality and/or navigation device functionality of the invention can be powered via alternate means. For example, an alternating current (AC) power supply can be employed to power one or both of the units. Additionally, in the case of a wired USB (universal serial bus) connection, the navigation device can be self powered via the USB connection.

FIG. 9C illustrates a side view of device 900. As shown and as described supra, screen 902 can be deployed on the front portion of the device 900. Accordingly, touch pad 906 can be arranged on the rear portion of the device 900 as illustrated. It will be appreciated that this exemplary arrangement can enhance ergonomic functionality of the device 900.

Figure 10A:
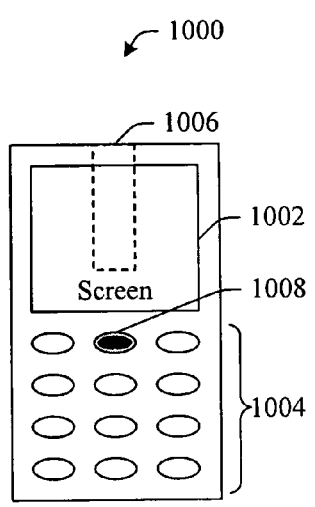
FIGS. 10A to 10C illustrate a device (e.g., personal organizer, pocket personal computer) that integrates a laser pointer in accordance with an aspect of the invention.
Figure 10B:
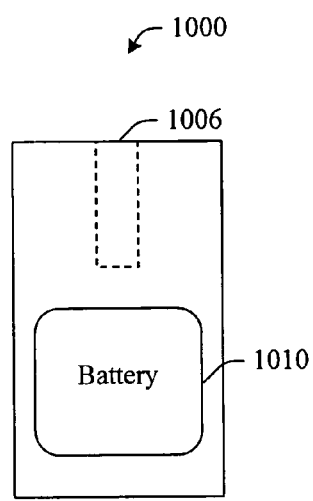
Figure 10C:
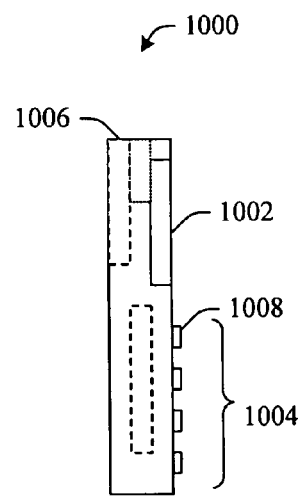

Still another aspect of the invention that can further integrate a laser pointing device with a touch screen navigation device as illustrated in FIGS. 10A to 10C. A front view of device 1000 is illustrated in FIG. 10A. As shown, device 1000 can include a touch sensitive screen 1002 and a key pad 1004. These components (1002, 1004) can facilitate the core functionality (e.g., telephonic communication, personal information management) of the device. The touch screen 1002 can accept spatial movement inputs from a user as described supra.

A laser component 1006 can be arranged within the housing of the device 1000. This laser component 1006 can enable a user to illuminate a target item by emitting a beam onto the target. In operation, a user can depress button 1008 thus activating laser 1006. It will be appreciated that any toggle mechanism can be used to effect activation of the laser.

FIG. 10B illustrates a rear view of device 1000. As shown, device 1000 can include a laser (Light Amplification by Stimulated Emission of Radiation) component 1006 and a power source (e.g., battery 1010). As described with reference to the navigation device described supra, a separate power source can be employed to supply power to the laser component 1006. As well, it will be appreciated that the laser component 1006 can be employed in conjunction with the navigation functionality of figures described above. In this aspect, the touch sensitive screen 1002 can be employed to detect motion relative to the navigation functionality.

FIG. 10C is a side view of device 1000. As shown, laser device 1006 can be deployed in the rear portion of the device opposite screen 1002. Although the aspect of FIG. 10 illustrates placement of the laser device 1006 in the top rear portion of the device 1000, it is to be appreciated that any placement can be effected without departing from the spirit and scope of the functionality of the invention and claims appended hereto. It will be appreciated that a laser generally emits photons in a narrow, well-defined, polarized, coherent beam of near-monochromatic light, consisting of a single wavelength or hue.

As described in the figures above, the invention can integrate navigational device (e.g., mouse) functionality into a cellular telephone or other handheld device (e.g., personal organizer, pocket personal computer, personal music player). In summary, FIGS. 8A to 8C illustrate a device that can employ existing optics from an image capture device (e.g., camera) as the optics to effect navigation. In this example, the invention can use the optics from an integrated camera as the optics for an optical mouse. An LED can be added as the light source to enable the device. The mouse engine can receive the input of the optics and route it over a Bluetooth™ HID, or other existing connection protocol to transfer the mouse coordinates to a desktop.

FIGS. 9A to 9C illustrate a device that employs a touch sensitive pad on the back of the phone as the mouse. A touch sensitive pad can be mounted on the back of a cellular phone and can be connected to a similar mouse engine as described above. This mouse engine can facilitate routing the data through a connection to the desktop.

FIGS. 10A to 10C illustrate a device (e.g., personal organizer, pocket personal computer) that integrates a laser pointer mechanism. The motions on a touch screen and the acceleration therewith can be routed through a mouse engine and converted to the data to navigate the mouse on the desktop. Additionally, the laser pointer can be integrated into the device thereby enabling presenters to use the device to point to slides and other target visuals.

Each of the aspects described above can employ existing keys on the device to launch applications on the desktop while navigating or engaging in a conversation using the device. For example, the device can be employed as a remote control to media computers or to control presentations. In still another aspect, a D-pad multidirectional controller that is common on some smartphones can be employed as a navigation/mouse wheel. For instance, this D-pad can be used to scroll through menus on a television or other entertainment system.

Figure 11:
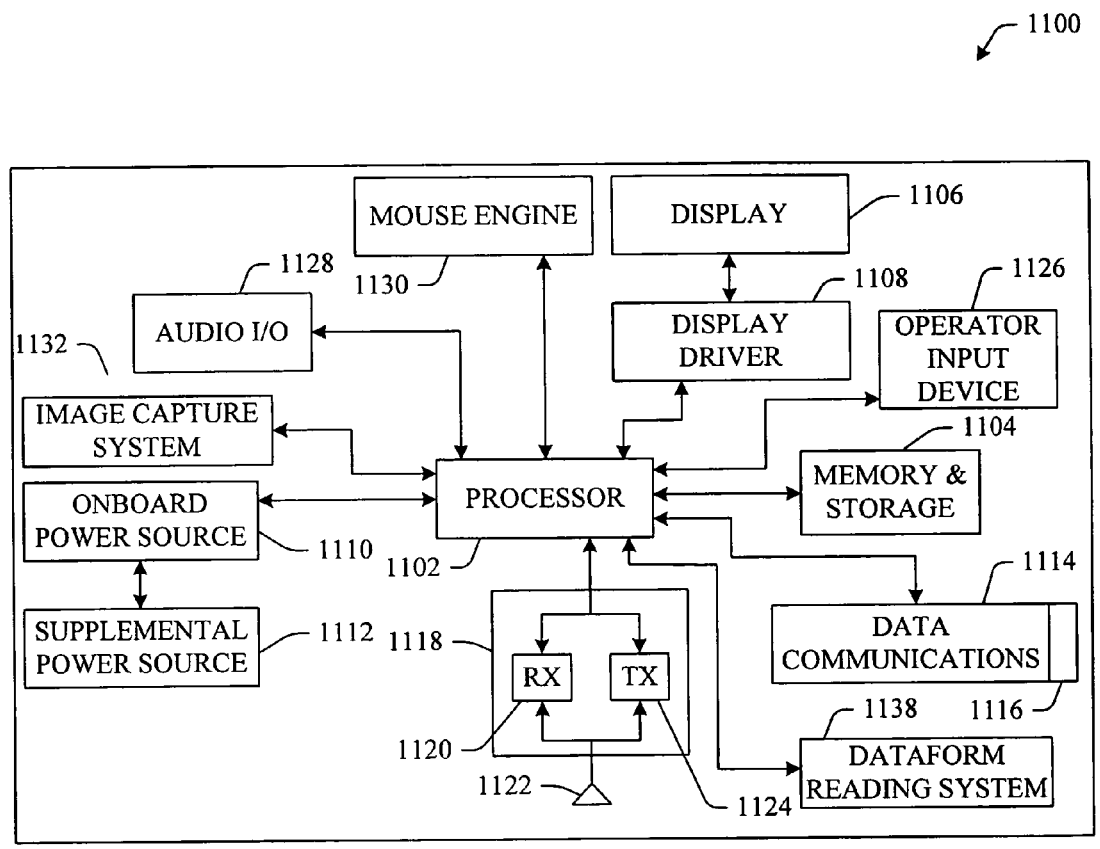
FIG. 11 is a schematic block diagram of a portable handheld device according to one aspect of the present invention.

Referring now to FIG. 11, there is illustrated a schematic block diagram of a portable hand-held device 1100 according to one aspect of the present invention, in which a processor 1102 is responsible for controlling the general operation of the device 1100. The processor 1102 can be programmed to control and operate the various components within the device 1100 in order to carry out the various functions described herein. The processor 1102 can be any of a plurality of suitable processors. The manner in which the processor 1102 can be programmed to carry out the functions relating to the present invention will be readily apparent to those having ordinary skill in the art based on the description provided herein.

A memory 1104 connected to the processor 1102 serves to store program code executed by the processor 1102, and also serves as a storage means for storing information such as movement data or the like. The memory 1104 can be a non-volatile memory suitably adapted to store at least a complete set of the information that is acquired. Thus, the memory 1104 can include a RAM or flash memory for high-speed access by the processor 1102 and/or a mass storage memory, e.g., a micro drive capable of storing gigabytes of data that comprises text, images, audio, and video content. According to one aspect, the memory 1104 has sufficient storage capacity to store multiple sets of information, and the processor 1102 could include a program for alternating or cycling between various sets of display information.

A display 1106 is coupled to the processor 1102 via a display driver system 1108. The display 1106 can be a color liquid crystal display (LCD), plasma display, touch screen display or the like. In one example, the display 1106 is a touch screen display. The display 1106 functions to present data, graphics, or other information content as well as to accept input navigational commands. Additionally, the display 1106 can display a variety of functions that control the execution of the device 1100. For example, in the touch screen example, the display 1106 can display touch selection buttons.

Power can be provided to the processor 1102 and other components forming the hand-held device 1100 by an onboard power system 1110 (e.g., a battery pack). In the event that the power system 1110 fails or becomes disconnected from the device 1100, a supplemental power source 1112 can be employed to provide power to the processor 1102 (and other components) and to charge the onboard power system 1110. The processor 1102 of the device 1100 induces a sleep mode to reduce the current draw upon detection of an anticipated power failure. It is to be appreciated that an additional power source (not shown) can be employed in addition to the power source 1110. For example, the additional power source (not shown) can be employed to power the navigation device portion of the handheld device whereas power source 1110 can be employed to power the core functionality of the device 1100.

The device 1100 includes a communication subsystem 1114 that includes a data communication port 1116, which is employed to interface the processor 1102 with a remote computer. The port 1116 can include at least one of Universal Serial Bus (USB) and IEEE 1394 serial communications capabilities. Other technologies can also be included, but, are not limited to, for example, infrared communication utilizing an infrared data port, Bluetooth™, etc.

The device 1100 can also include a radio frequency (RF) transceiver section 1118 in operative communication with the processor 1102. The RF section 1118 includes an RF receiver 1120, which receives RF signals from a remote device via an antenna 1122 and can demodulate the signal to obtain digital information modulated therein. The RF section 1118 also includes an RF transmitter 1124 for transmitting information to a remote device, for example, in response to manual user input via a user input device 1126 (e.g., a keypad) or automatically in response to the completion of a transaction or other predetermined and programmed criteria.

The transceiver section 1118 facilitates communication with a transponder system, for example, either passive or active, that is in use with product or item RF tags. The processor 1102 signals (or pulses) the remote transponder system via the transceiver 1118, and detects the return signal in order to read the contents of the tag memory. In one implementation, the RF section 1118 further facilitates telephone communications using the device 1100. In furtherance thereof, an audio I/O section 1128 is provided as controlled by the processor 1102 to process voice input from a microphone (or similar audio input device) and audio output signals (from a speaker or similar audio output device).

In another implementation, the device 1100 can provide speech recognition capabilities such that when the device 1100 is used as a voice activated device, the processor 1102 can facilitate high-speed conversion of the voice signals into text or operative commands. For example, the converted voice signals can be used to control the device 1100 in lieu of using manual entry via the keypad 1126.

Other devices such as a mouse engine 1130 and an image capture system 1132 can be provided within the housing of the device 1100 to effect functionality described supra. For example, the device 1100 can include an image capture system 1132 such that the user can record images and/or short movies for storage by the device 1100 and presentation by the display 1106. Additionally, image capture system 1132 can be employed in connection with the mouse engine 1100 to navigate within a graphical user interface on a computer desktop. It is to be appreciated that this image capture system 1132 can be a single system capable of performing both functions. The device 1100 may also include a dataform reading system 1138, as shown.

Figure 12:
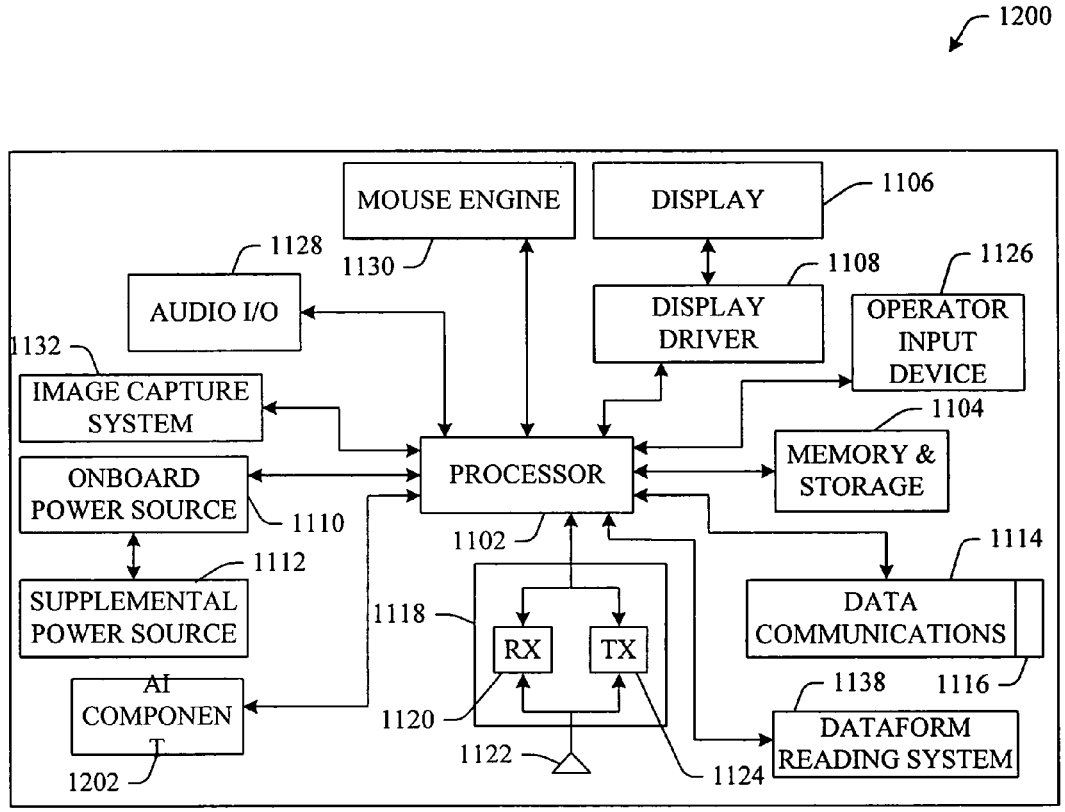
FIG. 12 illustrates an architecture of a portable handheld device including an artificial intelligence-based component that can automate functionality in accordance with an aspect of the invention.

FIG. 12 illustrates a system 1200 that employs artificial intelligence (AI) component 1202 which facilitates automating one or more features in accordance with the subject invention. The subject invention (e.g., with respect to navigating, selecting, initiating an engine) can employ various AI-based schemes for carrying out various aspects thereof. For example, a process for determining to initiate or discontinue use of the mouse engine can be facilitated via an automatic classifier system and process.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria where to navigate, what to select, when/if to engage/initiate a mouse engine, etc.

Figure 13:
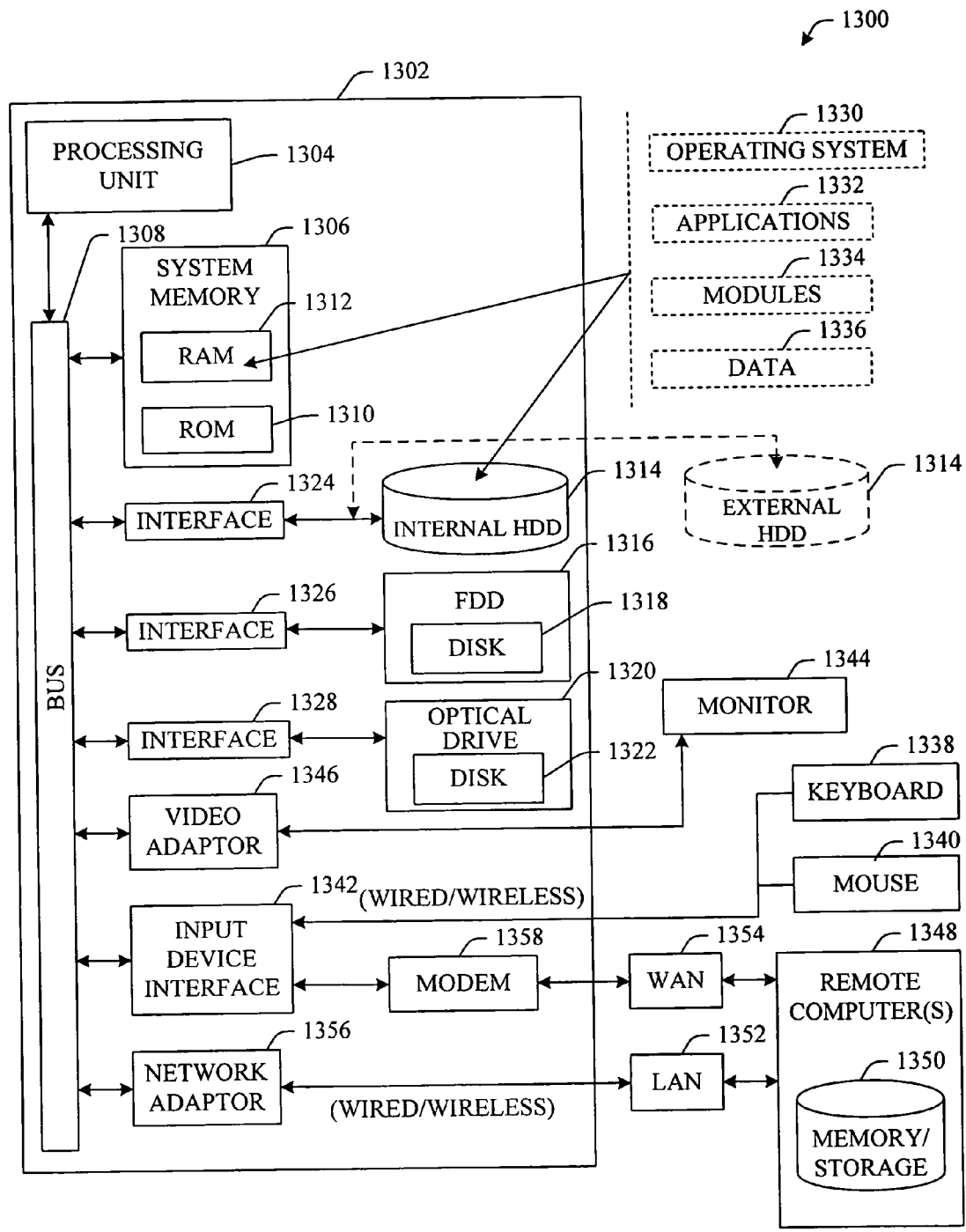
FIG. 13 illustrates a block diagram of a computer operable to execute the disclosed architecture.

Referring now to FIG. 13, there is illustrated a block diagram of a computer operable to execute the disclosed architecture. In order to provide additional context for various aspects of the subject invention, FIG. 13 and the following discussion are intended to provide a brief, general description of a suitable computing environment 1300 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 13, the exemplary environment 1300 for implementing various aspects of the invention includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a non-volatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA), which internal hard disk drive 1314 may also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of USB and IEEE 1394 interface technologies. Other external drive connection technologies are within contemplation of the subject invention.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is appreciated that the invention can be implemented with various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers, etc.

The computer 1302 may operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which may connect to a global communications network, e.g., the Internet.

When used in a LAN networking environment, the computer 1302 is connected to the local network 1352 through a wired and/or wireless communication network interface or adapter 1356. The adaptor 1356 may facilitate wired or wireless communication to the LAN 1352, which may also include a wireless access point disposed thereon for communicating with the wireless adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 via the serial port interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cellular telephone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 14:
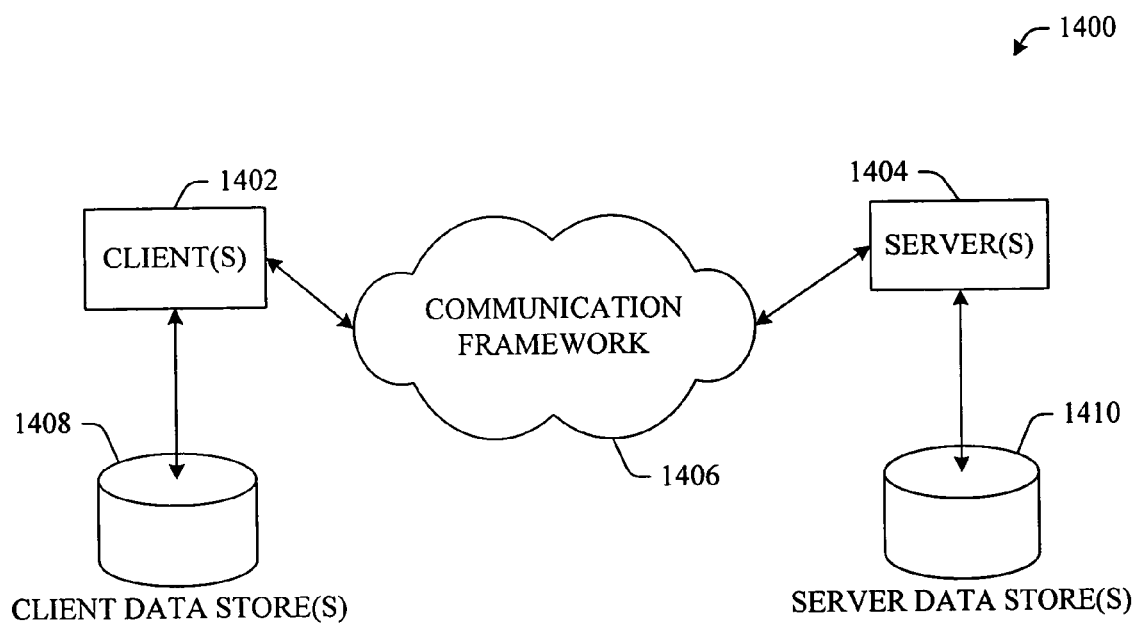
FIG. 14 illustrates a schematic block diagram of an exemplary computing environment in accordance with the subject invention.

Referring now to FIG. 14, there is illustrated a schematic block diagram of an exemplary computing environment 1400 in accordance with the subject invention. The system 1400 includes one or more client(s) 1402. The client(s) 1402 can be hardware and/or software (e.g., threads, processes, computing devices). The client(s) 1402 can house cookie(s) and/or associated contextual information by employing the invention, for example.

The system 1400 also includes one or more server(s) 1404. The server(s) 1404 can also be hardware and/or software (e.g., threads, processes, computing devices). The servers 1404 can house threads to perform transformations by employing the invention, for example. One possible communication between a client 1402 and a server 1404 can be in the form of a data packet adapted to be transmitted between two or more computer processes. The data packet may include a cookie and/or associated contextual information, for example. The system 1400 includes a communication framework 1406 (e.g., a global communication network such as the Internet) that can be employed to facilitate communications between the client(s) 1402 and the server(s) 1404.

Communications can be facilitated via a wired (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates navigating on a display of a computer, comprising:
   a mouse engine component that provides mouse functionality, including detecting at least one of location information or movement information of a mouse;
   an interface component that integrates the mouse engine into a handheld communication device having a front portion and a rear portion wherein one or more components that provide telecommunication functionality are deployed on the front portion;
   a communication component that transmits information including at least one of the location information or the movement information from the handheld communication device to the computer, wherein the mouse functionality effects navigation on the display of the computer; and
   a touch pad component that receives an input from a user based at least in part on the location information, wherein the touch pad component is deployed on the rear portion to allow concurrent use of the mouse functionality and the telecommunication functionality.

2. The system of claim 1, wherein the handheld communication device is at least one of a cellular telephone, a smartphone and a personal data assistant (PDA).

3. The system of claim 1, further comprising a sensor component that detects a location of the mouse.

4. The system of claim 1, further comprising:
   an optics component that is integrated into an image capture system of the handheld communication device;
   a light source component that illuminates a surface such that the optics component can acquire spatial information related to the location; and
   a sensor component that receives the spatial information from the optics component and communicates the spatial information to the mouse engine.

5. The system of claim 4, wherein the light source is at least one of a light emitting diode (LED) and a laser diode.

6. The system of claim 1, further comprising a control input component that facilitates input of a selection instruction by at least one of a control key and an audible prompt command.

7. The system of claim 1, further comprising a laser pointer device that facilitates emitting a laser beam that identifies a desired target.

8. The system of claim 1, further comprising an artificial intelligence component that infers an action that a user desires to be automatically performed.

9. A method of integrating navigational functionality into a handheld communication device that provides telecommunication functionality, comprising:
   supplying power to the handheld communication device having a front portion and a rear portion wherein one or more components that provide the telecommunication functionality are deployed on the front portion;
   interfacing a mouse engine, providing mouse functionality including detecting at least one of location information or movement information of a mouse, into the handheld communication device;
   initiating the mouse engine;
   employing a touch pad, deployed on the rear portion, to detect spatial movement of the mouse to allow concurrent use of the mouse functionality and the telecommunication functionality;
   processing the spatial movement; and
   communicating the spatial movement from the handheld communication device to a computer, wherein the mouse functionality effects navigation on a display of the computer.

10. The method of claim 9, wherein the handheld communication device is at least one of a cellular telephone, a smartphone and a PDA.

11. The method of claim 9, wherein the act of detecting spatial movement further comprises employing an image capture device and a light source that determine the spatial movement.

12. The method of claim 9, wherein the act of detecting spatial movement further comprises employing a roller ball that determines the spatial movement.

13. A computer-readable storage medium having computer-executable instructions stored thereon that when executed by a processor implement the method of claim 9.

14. A system that facilitates navigating on a display of a computer system, comprising:
   means for integrating a pointing device into a handheld device having a front portion and a rear portion wherein one or more components that provide telecommunication functionality are deployed on the front portion;
   means for providing spatial position detection functionality for detecting a spatial position of a mouse on a surface, the means for providing spatial position detection functionality deployed on the rear portion to allow concurrent use of the mouse functionality and the telecommunication functionality;
   means for converting the spatial position of the mouse on the surface to a location on the display; and
   means for communicating the location to the computer system, wherein the spatial position detection functionality and the telecommunication functionality are concurrently available and the spatial position detection functionality effects navigation on the display of the computer system.

15. The system of claim 14, wherein the means for detecting a spatial position is at least one of an image capture device, a touch pad, a touch screen and a roller ball.

16. The system of claim 14, further comprising means for emitting a light beam that identifies a desired target.

* * * * *